United States Patent [19]

Levens

[11] 4,223,067
[45] Sep. 16, 1980

[54] FOAM-LIKE PRESSURE-SENSITIVE ADHESIVE TAPE

[75] Inventor: Dennis L. Levens, Hudson, Wis.

[73] Assignee: Minnesota Mining and Manufacturing Company, St. Paul, Minn.

[21] Appl. No.: 889,541

[22] Filed: Mar. 27, 1978

Related U.S. Application Data

[63] Continuation-in-part of Ser. No. 797,409, May 16, 1977, abandoned.

[51] Int. Cl.$^2$ .......................... B32B 3/26; B32B 17/00
[52] U.S. Cl. .................................... 428/308; 428/325; 428/338; 428/355; 428/406
[58] Field of Search ...................... 427/180, 203, 204; 428/40, 308, 325, 338, 339, 343, 352, 354, 355, 406, 441, 500, 407

[56] References Cited

U.S. PATENT DOCUMENTS

| | | | |
|---|---|---|---|
| Re. 24,906 | 12/1960 | Ulrich | 428/355 |
| 2,753,285 | 7/1956 | Pahl et al. | 428/354 |
| 3,030,215 | 4/1962 | Veatch et al. | 428/406 |
| 3,314,838 | 4/1967 | Erwin | 428/406 |
| 3,365,315 | 1/1968 | Beck et al. | 260/37 R |
| 3,502,497 | 3/1970 | Crocker | 428/354 |
| 3,585,157 | 6/1971 | Beck | 260/2.5 AK |
| 4,049,483 | 9/1977 | Loder et al. | 428/355 X |

Primary Examiner—Bruce H. Hess

[57] ABSTRACT

Pressure-sensitive adhesive tape, the adhesive layer of which is a void-free matrix of a pressure-sensitive adhesive polymer and glass microbubbles and has the appearance of a foam-backed tape. The adhesive layer is fairly elastic under briefly applied stresses but has low elasticity under prolonged stress and hence conforms and adheres well to rough and uneven surfaces.

12 Claims, 1 Drawing Figure

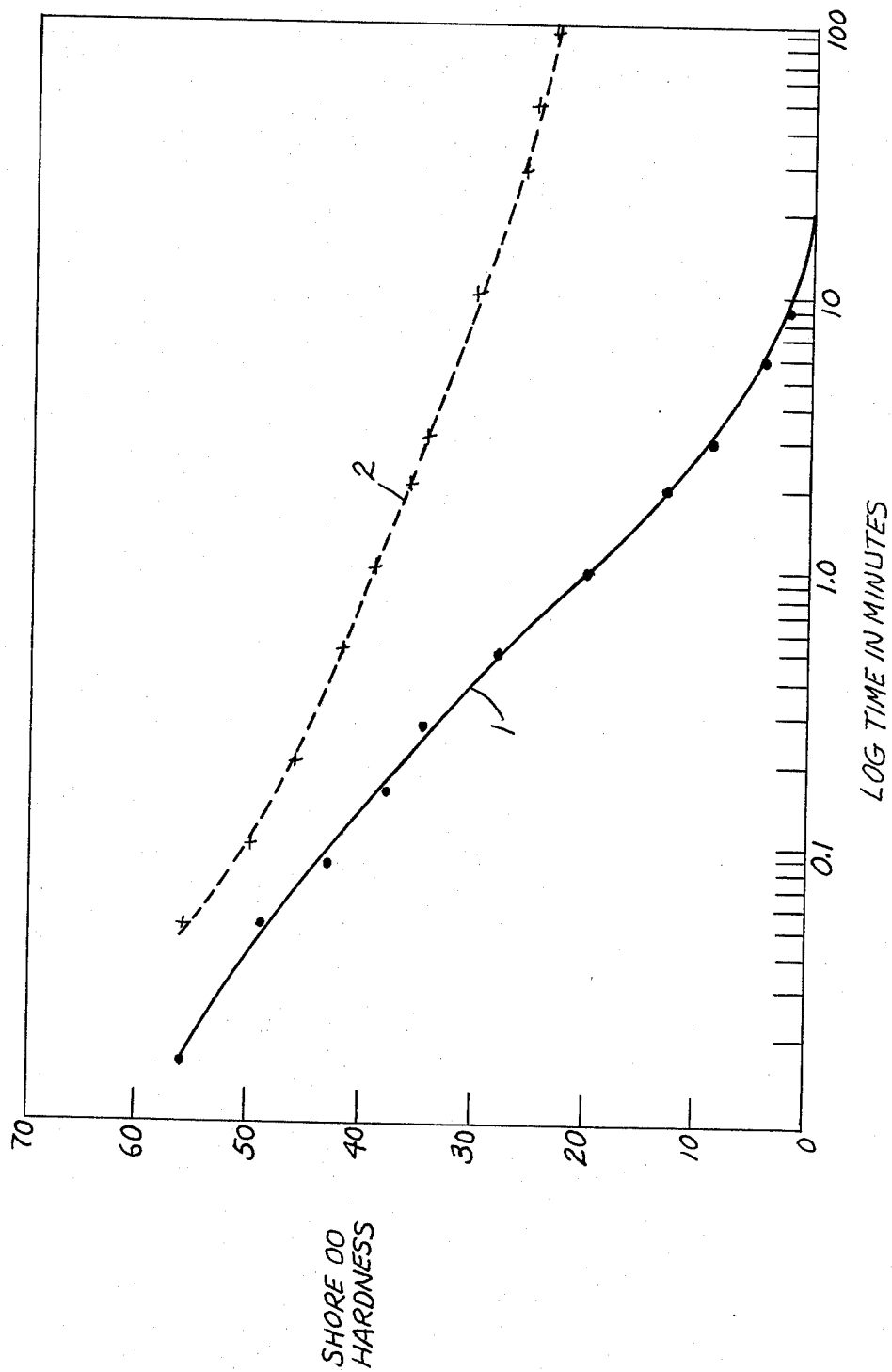

FOAM-LIKE PRESSURE-SENSITIVE ADHESIVE TAPE

CROSS-REFERENCE TO RELATED APPLICATION

This application is a continuation-in-part of applicant's copending application Ser. No. 797,409, filed May 16, 1977 now abandoned.

BACKGROUND OF THE INVENTION

Tapes having pressure-sensitive adhesive layers exceeding 0.1–0.2 mm in thickness tend to be difficult and expensive to manufacture and to have low shear strength. For applications requiring greater thickness, foam-backed pressure-sensitive adhesive tapes such as disclosed in Canadian Pat. No. 747,341 are often employed. However, the porous nature of the foam involves a number of problems such as a tendency to wick liquids. The elastic memory of some foams tends to cause them to lift from low spots on rough or uneven surfaces. Foam layers of less than about 1.0 mm are difficult to manufacture and hence rather expensive.

Brochman U.S. Pat. No. 3,565,247 was in part directed to the problem of economically producing pressure-sensitive adhesive layers exceeding 0.1 mm in thickness, disclosing a microcellular adhesive layer which is both a foam and a pressure-sensitive adhesive. When compressed to half its original thickness, the microcellular adhesive layer typically shows less than 5 percent recovery. Apparently the surfaces at the opposite sides of each cell adhere to each other to inhibit recovery. Such tapes are not on the market.

OTHER PRIOR ART

Belgian Pat. No. 675,420 which was published May 16, 1966, concerns process and apparatus for making conventional pressure-sensitive adhesive tape of acrylate copolymers such as were earlier disclosed in U.S. Pat. No. Re. 24,906 (Ulrich). In the process of the Belgian patent, a mixture of monomers is coated onto a backing sheet and then polymerized in situ to a pressure-sensitive adhesive state. The polymerization may be initiated by ultraviolet light or by heat if the mixture includes a heat-activatable polymerization initiator. A typical monomer mixture which is polymerizable by ultraviolet light comprises 90 parts ethyl-hexyl acrylate, 5 parts acrylic acid and 5 parts polyvinylisobutylic acid. While the Belgian patent does not mention the thickness of its pressure-sensitive adhesive layers, the layers of the examples have coating weights of 10–50 g/m$^2$, from which it can be deduced that the thicknesses were about 0.01 to 0.05 mm. The Belgian technique should permit somewhat greater thicknesses, although when using ultraviolet light, the maximum thickness would be limited by the transparency of the polymerizable coating.

An article by Blackley and Sheikh, "Particulate Reinforcement of Polyacrylate Elastomers", Rubber Chemistry and Technology, Vol. 48 (1975), pages 819–859, concerns the effect of fine-particle filler in a polyacrylate elastomer matrix. Specifically, glass beads were dispersed into a prepolymer syrup of poly(ethyl acrylate) dissolved in ethyl acrylate, benzoin and ethylene glycol dimethacrylate which in sheet form was subjected to ultraviolet light to complete the polymerization. Average diameter of the glass beads was about 3 micrometers (page 823).

A large number of patents relating to the manufacture of glass microbubbles suggest their use as fillers for a variety of materials. After making such a suggestion, Yeatch U.S. Pat. No. 2,797,201 states: "The particles may also be adhered together, using various techniques or binders, to produce a cellular type material of the nature of plastic foam and expanded plastics, for use as thermal, electrical and sound insulation material board, plaster board, gaskets, seals . . . " (col. 10, lines 35 ff.)

Jonnes U.S. Pat. No. 3,524,794 discloses a fluid sealing gasket comprising a vulcanized elastomer and glass microbubbles occupying about 50% of the volume of the gasket. The preferred thickness of the gasket is about one millimeter.

Erwin U.S. Pat. No. 3,314,838 discloses a spreadable liquid composition comprising a pressure-sensitive adhesive, a volatile liquid vehicle and glass microbubbles. The composition may be spread onto a substrate such as a billboard and allowed to dry to provide a coating as shown in the drawing wherein the diameter of a typical microbubble exceeds the average thickness of the pressure-sensitive adhesive layer. Flexible sheet material which is laid over the coating contacts only the tips of its "goose-flesh" surface and hence can be slid into precise position. After it is in position, pressure sufficient to break the microbubbles is applied to force the surface of the sheet into full contact with the adhesive. Implicit in the Erwin disclosure is the concept of applying the adhesive to the flexible sheet material instead of to the billboard or other substrate.

THE PRESENT INVENTION

The present invention provides what is believed to be the first truly economical tape having a pressure-sensitive adhesive layer of 0.2 to 1.0 mm in thickness. However, the novel tape can be economically produced at thicknesses as small as 0.1 mm and as great as 2.5 mm or more.

The pressure-sensitive adhesive layer of the novel tape offers good resistance to both peel and shear forces and also possesses an extraordinary combination of properties, e.g., being fairly elastic under briefly applied stresses but having very low elasticity after stress is maintained for a period of time. When pressed against a rough surface, the adhesive flows into and remains in intimate contact with minute contours after the pressure is removed. For example, the ultimate softness of the adhesive permits the novel tape to be used to mount a decorative metal medallion to cover round-head screws, because the adhesive can flow around the screw heads to make permanent contact with the underlying surface. In contrast, the elasticity of a typical foam-backed pressure-sensitive adhesive tape would tend to lift it from the underlying surface.

Typically, the adhesive layer of a pressure-sensitive adhesive tape of the present invention, when tested at a thickness of 3 mm, has a Shore 00 hardness of at least 50 at one second and at most 30 at 30 minutes.

In short, the tape of the invention comprises a pressure-sensitive adhesive layer consisting essentially of a polymeric pressure-sensitive adhesive matrix and glass microbubbles having a specific gravity not exceeding 1.0 (measured in bulk) dispersed throughout the matrix. Although the novel tape has the physical appearance of a foam-backed pressure-sensitive adhesive tape, its polymeric matrix is substantially free from voids except for the hollow cavities of the individual microbubbles. In tests on a number of tapes of the invention, the pressure-sensitive adhesive layer showed no water absorption.

The novel tape can be made in essentially the same manner as the tape of the aforementioned Belgian Pat. No. 675,420 except that glass microbubbles are dispersed into the polymerizable mixture before it is coated out. Ideally the polymerization is initiated by ultraviolet light, in which event both the polymerizable mixture and the microbubbles must be reasonably transmissive of ultraviolet light. The ultraviolet transparency is enhanced if the walls of the microbubbles are thin. Furthermore, glass microbubbles having thinner walls tend to be less expensive on a volume basis. Hence, their specific gravity is preferably less than 0.2, ideally less than 0.1.

Instead of employing ultraviolet light, the matrix may contain a heat-activatable polymerization initiator and hence be polymerized by heat. This permits one to use microbubbles which are opaque to ultraviolet light, but the process may be slower and thus more expensive than polymerization by ultraviolet light.

The matrix may be coated onto and polymerized against a backing sheet which has a low-adhesion surface from which the adhesive layer is readily removable or onto a backing sheet to which it remains permanently adhered, e.g., aluminum or steel foil, crepe paper or a plastic film such as cellulose acetate or biaxially-oriented polyethylene terephthalate film.

The average diameter of the glass microbubbles should be 10–200 micrometers. Microbubbles of smaller average diameter would tend to be unduly expensive, whereas it would be difficult to coat out a polymerizable mixture containing microbubbles of larger average diameter. Preferably the average diameter of the microbubbles is within the range of 20 to 80 micrometers. The glass microbubbles should comprise 20–65 volume percent of the pressure-sensitive adhesive layer. It would be unduly difficult to try to make a coherent void-free coating at higher percentages, whereas the advantages of the invention would not be significantly realized at less than 20 volume percent of the microbubbles. Preferably 45–55 volume percent of the pressure-sensitive adhesive layer comprises glass microbubbles.

The thickness of the pressure-sensitive adhesive layer should exceed three times the average diameter of the microbubbles and twice the diameter of substantially every microbubble. This allows the microbubbles to migrate within the adhesive under applied pressure instead of breaking, and the adhesive can flow into intimate contact with rough or uneven surfaces, while retaining its foam-like character. Optimum performance in this respect is attained if the thickness of the pressure-sensitive adhesive layer exceeds seven times the average diameter of the microbubbles.

When the polymerizable mixture has a viscosity of less than 1000 cps. prior to addition of the microbubbles, it is desirable to employ a thixotropic agent such as fumed silica to keep the microbubbles uniformly dispersed. Even in the presence of a thixotropic agent, it is desirable after storage to stir the mixture immediately prior to coating it out to insure uniform dispersion of the microbubbles.

Because the glass microbubbles are uniformly dispersed throughout the polymerizable mixture before it is coated out and are small relative to the thickness of the coating, the exposed surface of the resultant pressure-sensitive adhesive tape tends to be smooth and can be expected to have a root-mean-square surface roughness not exceeding 8 micrometers. When the exposed surface of the adhesive layer is covered with a temporary low-adhesion protective web, it will in time take on the contour of the protective web. If that contour is rough, the adhesive layer will have a rough surface after removal of the protective web but will quickly conform under pressure to substrates to which it is applied to form strong adhesive bonds.

Where it is desired to adhere the novel tape to a surface to which its pressure-sensitive adhesive layer would not form a strong bond, it may be desirable to apply to one or both of its faces of its microbubble-filled adhesive layer a layer of unfilled pressure-sensitive adhesive which is especially selected for its adhesion to that surface. For example, strong bonds to certain automotive paint surfaces can be attained only by pressure-sensitive adhesives which cannot be polymerized by ultraviolet light. Typically the root-mean-square roughness of the exposed face of the unfilled layer is less than 5 micrometers.

THE DRAWING

The single FIGURE of the drawing is a chart on a semi-log scale showing the hardness of the pressure-sensitive adhesive layers of two tapes of the invention as a function of time.

In the following examples, all parts are by weight except where otherwise indicated.

EXAMPLE 1

In a 1000-ml stainless steel beaker, 294 grams of isooctyl acrylate and 6 grams of acrylic acid were blended with a 3-blade propeller mixer at 500 rpm. To this blend was added 0.75 gram of benzoin ethyl ether with stirring until dissolved. Nine grams of fumed silica ("Cab-o-sil" M-5) was blended in until a uniform dispersion was achieved, about 10 minutes. The stirring rate was increased to 1500 rpm, and 33.3 grams of glass microbubbles were added. The microbubbles had a specific gravity of 0.07 (measured in bulk—true value 0.11) and were 20–150 micrometers in diameter (average 55 micrometers).

This material was knife-coated to a thickness of 0.75 mm onto a paper backing sheet having a low-adhesion silicone surface. The coating was placed under an ultraviolet lamp (Sylvania FR 40BL-235) at a distance of 15 cm in a nitrogen atmosphere containing a maximum of 150 ppm of oxygen. After five minutes, the coating was fully polymerized without any noticeable shrinkage. Its surface was smooth and free from wrinkles. The resultant pressure-sensitive adhesive tape had the appearance and feel of a foam-backed pressure-sensitive adhesive tape.

EXAMPLES 2–3

Additional tapes of the present invention were prepared in the same manner as in Example 1 using the following materials to form the microbubble-filled pressure-sensitive adhesive layer, except that the UV-polymerizable mixture of Example 3 was coated to a thickness of 1.0 mm.

|  | Example | |
|---|---|---|
| Parts by weight | 2 | 3 |
| Isooctyl acrylate | 67.09 | 80 |
| Acrylic acid | 11.84 | 20 |
| Benzoin ethyl ether | 0.19 | 0.25 |

-continued

| Parts by weight | Example 2 | Example 3 |
|---|---|---|
| Polyvinyl ethyl ether (Union Carbide EDBM grade) | 2.24 | 3 |
| Hydrocarbon-type tackifier (Hercules XPS 541) | 7.45 | — |
| Wetting agent ("Triton" X-100) | 3.73 | 15 |
| Fumed silica | 1.5 | 7 |
| Glass microbubbles of Example 1 | 5.96 | 5 |

To each face of the microbubble-filled pressure-sensitive adhesive layer of Example 3 was laminated an unfilled pressure-sensitive acrylate copolymer adhesive layer of the type disclosed in U.S. Pat. No. Re. 24,906 having a thickness of 0.075 mm and carried by a paper backing sheet having a low-adhesion surface. One unfilled layer and the microbubble-filled layer of Example 3 were passed face-to-face between a rubber and a steel roll which was heated to 120° C. The pressure applied by the rolls was 275 kPa. Then the backing sheet of the microbubble-filled layer was peeled away to expose its other face for lamination to a second strip of the unfilled layer. The resultant laminated tape of Example 3 was employed in the testing reported below.

The microbubbles occupied the following volume percentages of the pressure-sensitive adhesive layers, exclusive of the unfilled surface layers of the tape of Example 3:

| Adhesive layer of Example | 1 | 2 | 3 |
|---|---|---|---|
| Volume % microbubbles | 47 | 35 | 27 |

| Testing | | | |
|---|---|---|---|
| Tape of Example | 1 | 2 | 3 |
| T-peel in g/cm of width (ASTM D-1876-72) | 3200 | 4450 | 5320 |
| Shear strength at 21° C. aluminum backing to stainless steel, 2.54 × 1.27 cm, time to failure | 500 g 20 min. | 1000 g <10,000 min. | 1000 g <10,000 min. |

Strips of the tape 2.5 cm in width were stretched 300% (12.5 cm to 50 cm) while supported in water and released after 24 hours. The following table reports the degree of stretching 5 seconds after removal of the stress and 24 hours later.

| Tape of Example | 1 | 2 | 3 |
|---|---|---|---|
| % stretched after | | | |
| 5 seconds | 260% | 258% | 285% |
| 24 hours | 217% | 230% | 260% |

Another set of strips 2.5 cm in width was stretched 100% (from 12.5 cm to 25 cm) in air and released after 10 seconds. The following table reports the lengths 30 seconds after removal of the stress.

| Tape of Example | 1 | 2 | 3 |
|---|---|---|---|
| Recovered to | 14 cm | 16 cm | 13 cm |

The laminated tape of Example 3 was especially useful for adhering metal medallions to embossed vinyl fabric of the type used for car tops. Its pressure-sensitive adhesives flowed under pressure into the contours of the fabric and showed no tendency to work loose.

To provide specimens of sufficient thickness for testing the hardness of the adhesive layer, two strips of the tape were laid face-to-face and laminated together using a hard rubber roll under hand pressure. Then one backing sheet was peeled off to laminate a third strip and its backing sheet was peeled off to laminate a fourth strip. The total thickness of 3 mm insured that the hardness readings would not be unduly affected by the underlying table of the hardness tester.

Then using a Shore Hardness Tester on the 00 scale, readings were taken at various periods of time after the probe first contacted the adhesive. The readings were:

| Elapsed Time in Minutes | Shore 00 Hardness | |
|---|---|---|
| | Example 1 | Example 2 |
| 0.017 | 56 | — |
| 0.05 | 49 | 56 |
| 0.083 | 43 | — |
| 0.1 | — | 50 |
| 0.17 | 38 | — |
| 0.2 | — | 46 |
| 0.25 | 35 | — |
| 0.5 | 28 | 42 |
| 1.0 | 20 | 39 |
| 2.0 | 13 | 36 |
| 3.0 | 9 | 34 |
| 6.0 | 4 | — |
| 9.0 | 2 | — |
| 10.0 | — | 30 |
| 20.0 | 0 | — |
| 28.0 | — | 26 |
| 45.0 | — | 25 |
| 90.0 | — | 23 |

The drawing shows these readings on a semi-log scale, curve 1 for Example 1 and curve 2 for Example 2. The adhesives of both Examples 1 and 2 were reasonably elastic under briefly applied stresses but much softer under prolonged stress. The adhesive of Example 1 responded to prolonged stress as if it were virtually dead-soft. In each case, if the probe were applied only for a few seconds and removed, the mark of the probe would quickly disappear. At the conclusion of each test, the mark of the probe remained essentially unchanged after 24 hours, indicating that the adhesive had essentially taken a permanent set.

EXAMPLE 4

The following ingredients were blended and coated onto a low-adhesion backing essentially by the procedure of Example 1:
  100 g of 90/10 isooctyl acrylate/acrylic acid partially reacted to a viscosity of 1000-1200 cps. and containing 0.25 g benzoin ethyl ether and 0.1 g of a crosslinking agent,
  10 g of an unreacted mixture of 90 parts isooctyl acrylate and 10 parts acrylic acid,
  7 g of glass microbubbles of Example 1.

The coatings were transferred to a biaxially-oriented polyethylene terephthalate backing 0.075 mm in thickness and slit to a width of 1.27 cm for testing, with results as follows:

| Adhesion thickness | Shear Resistance at 500 g and at 65° C. from stainless steel (Minutes) | 180° Peel Failure from glass at 30 cm/minute and 21° C. (g/cm of width) |
|---|---|---|
| 0.125 mm | 910 | 1280 |

-continued

| Adhesion thickness | Shear Resistance at 500 g and at 65° C. from stainless steel (Minutes) | 180° Peel Failure from glass at 30 cm/minute and 21° C. (g/cm of width) |
| --- | --- | --- |
| 0.5 mm | 1088 | 2624 |

In each test, a hard-rubber roller having a mass of 6.8 kg was employed in making the bonds to the test surfaces. In the peel test, the tape then remained in contact with the glass surface for 24 hours at ordinary room temperature before testing.

EXAMPLES 5-6

Two pressure-sensitive adhesive tapes were prepared as in Example 1 except that the average diameter of the microbubbles was 63 micrometers, the ratio of isooctyl acrylate to acrylic acid was 87.5:12.5, and the thickness of the polymerized adhesive layer was 1.0 mm. One of the tapes [Example 5] was unmodified. To the exposed face of the other [Example 6] was laminated an unfilled pressure-sensitive adhesive layer of the copolymer of 90 parts isooctyl acrylate and 10 parts acrylic acid, the thickness of which was 50 micrometers.

Using a proficorder, the root-mean-square roughness of exposed faces of the tapes was:

Example 5 (unmodified): 3.8 micrometers
Example 6 (laminated): 1.8 micrometers

Each of the tapes showed essentially no moisture pickup after being immersed in water for 24 hours at ordinary room temperature.

I claim:

1. Pressure-sensitive adhesive tape comprising a pressure-sensitive adhesive layer having a thickness exceeding 0.2 mm and consisting essentially of a polymeric pressure-sensitive adhesive matrix and glass microbubbles of specific gravity not exceeding 1.0 dispersed throughout the matrix, the microbubbles having an average diameter of 10 to 200 micrometers and comprising 20 to 65 volume percent of the pressure-sensitive adhesive layer, the thickness of which exceeds three times the average diameter of the microbubbles and twice the diameter of substantially every microbubble, said matrix being substantially free from voids except for the hollow spaces of the individual microbubbles.

2. Pressure-sensitive adhesive tape as defined in claim 1 wherein the thickness of said pressure-sensitive adhesive layer exceeds seven times the average diameter of the microbubbles.

3. Pressure-sensitive adhesive tape as defined in claim 2 wherein said glass microbubbles have a specific gravity of less than 0.2 and are ultraviolet-transparent.

4. Pressure-sensitive adhesive tape as defined in claim 3 wherein the average diameter of the microbubbles is 20 to 80 micrometers.

5. Pressure-sensitive adhesive tape as defined in claim 4 wherein the glass microbubbles comprise 45 to 55 volume percent of said pressure-sensitive adhesive layer.

6. Pressure-sensitive adhesive tape as defined in claim 5 comprising a backing sheet having a low-adhesion surface permitting it to be peeled away from the pressure-sensitive adhesive layer and discarded.

7. Pressure-sensitive adhesive tape as defined in claim 6 wherein the thickness of said pressure-sensitive adhesive layer is 0.2 to 1.0 mm.

8. Pressure-sensitive adhesive tape as defined in claim 7 wherein an unfilled pressure-sensitive adhesive layer is laminated to one face of the microbubble-filled layer and the exposed face of the laminated unfilled layer has a root-mean-square surface roughness of less than 5 micrometers.

9. Pressure-sensitive adhesive tape as defined in claim 8 wherein an unfilled pressure-sensitive adhesive layer is laminated to both faces of the microbubble-filled layer.

10. Pressure-sensitive adhesive tape as defined in claim 9 wherein the pressure-sensitive adhesive of all three layers is an acrylic copolymer.

11. Pressure-sensitive adhesive tape as defined in claim 1 wherein said microbubble-filled pressure-sensitive adhesive layer is fairly elastic under briefly applied stresses but has low elasticity after stress is maintained for a period of time.

12. Pressure-sensitive adhesive tape as defined in claim 11 wherein the Shore 00 hardness of the microbubble-filled adhesive tested at an adhesive thickness of 3 mm is at least 50 at one second and at most 30 at 30 minutes.

* * * * *